(No Model.) 2 Sheets—Sheet 1.
H. P. PEDERSEN.
PHOTOGRAPHIC CAMERA.
No. 371,352. Patented Oct. 11, 1887.
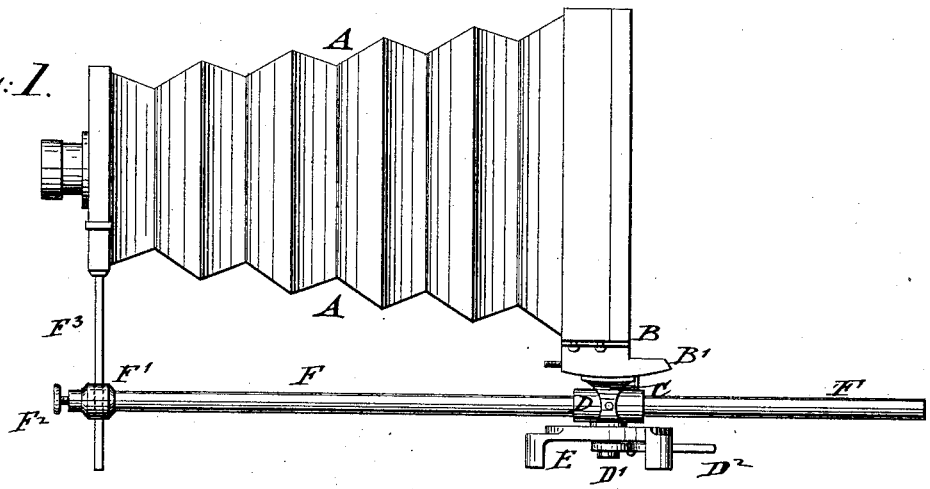
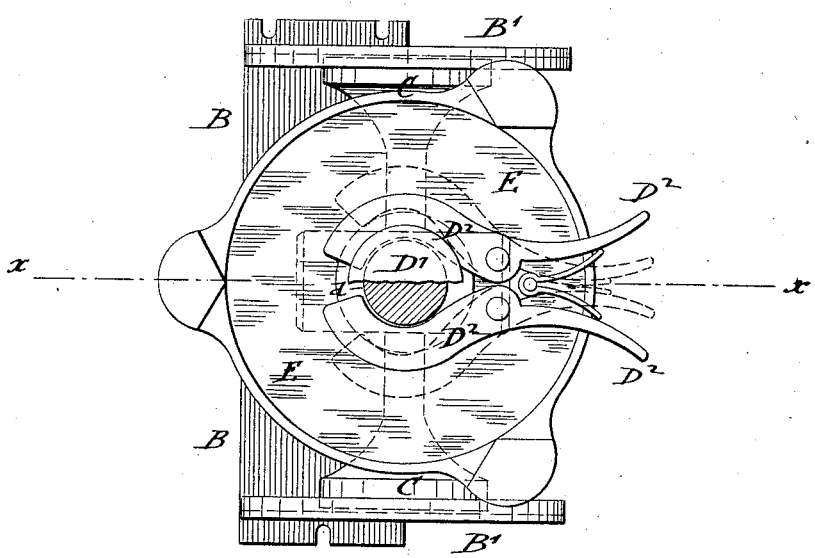
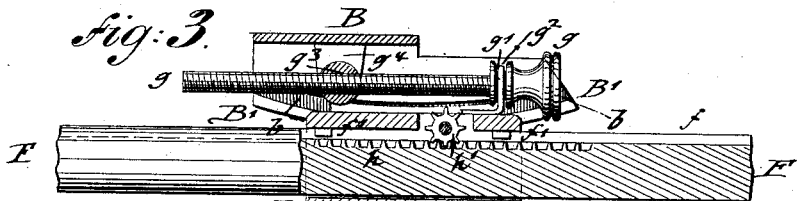
WITNESSES: A. Schehl. Carl Key.
INVENTOR Hans P. Pedersen
BY Goepel & Raegener
ATTORNEYS.

(No Model.) 2 Sheets—Sheet 2.
H. P. PEDERSEN.
PHOTOGRAPHIC CAMERA.
No. 371,352. Patented Oct. 11, 1887.
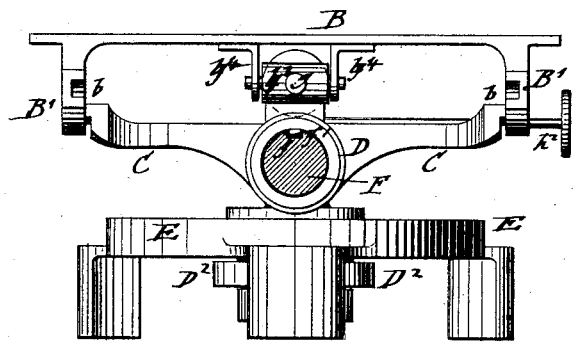
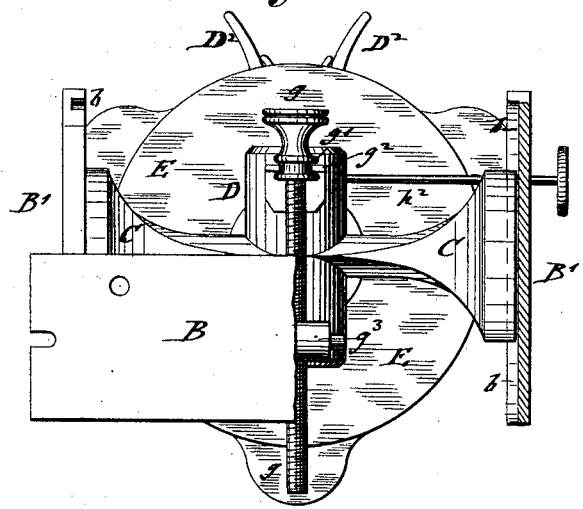
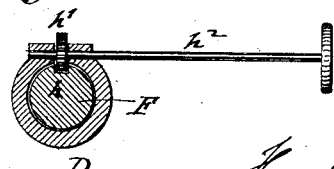
WITNESSES:
A. Schehl.
Carl Karz
INVENTOR
Hans P. Pedersen
BY
James Raegener
ATTORNEYS.

UNITED STATES PATENT OFFICE.

HANS P. PEDERSEN, OF BROOKLYN, NEW YORK.

PHOTOGRAPHIC CAMERA.

SPECIFICATION forming part of Letters Patent No. 371,352, dated October 11, 1887.

Application filed May 4, 1887. Serial No. 237,023. (No model.)

*To all whom it may concern:*

Be it known that I, HANS P. PEDERSEN, of Brooklyn, county of Kings, and State of New York, have invented certain new and useful Improvements in Photographic Cameras, of which the following is a specification.

This invention has reference to certain improvements in photographic cameras of that class which are used by amateurs, the improvement being designed with a view of decreasing the weight of the supporting and adjusting mechanism; and the invention consists of a photographic camera which is supported on a longitudinal rod guided in a sleeve the shank of which has an annular groove and is attached to a socket of the supporting-tripod and retained thereon by spring-pressed clamping-jaws, which engage the annular groove of said shank. The front part of the camera is adjusted by arc-shaped guide-rails at its lower part on a transverse piece or bridge attached to the guide sleeve of the longitudinal rod and adjusted to different inclinations by a set-screw that turns in a keeper of the sleeve and engages a swivel-nut at the bottom part of the front end of the camera. The rear end of the camera is adjusted by a vertical rod in a socket-sleeve at the rear end of the longitudinal supporting-rod and rigidly clamped thereto by a set-screw.

In the accompanying drawings, Figure 1 represents a side elevation of my improved photographic camera. Fig. 2 is a bottom view of the top piece or platform of the tripod drawn on a larger scale and showing the connection of the same with the supporting-piece of the camera. Fig. 3 is a vertical longitudinal section on line $x\ x$, Fig. 2. Fig. 4 is an end elevation of Fig. 3. Fig. 5 is a plan view of Fig. 4 with a portion of the supporting-plate of the camera broken away, and Fig. 6 is a detail vertical transverse section of the guide-sleeve and the adjusting mechanism of its longitudinal rod.

Similar letters of reference indicate corresponding parts.

Referring to the drawings, A represents an extensible camera of any approved construction, the front end of which is supported on a metallic plate, B, that is attached to the bottom of the front frame of the camera. The supporting-plate B is provided with arc-shaped rails B', which are provided with grooves $b$, for moving along the ends of a transverse bridge, C, that is cast integral with a sleeve, D, on which the camera is supported. The sleeve D has a downwardly extending shank, D', made integral therewith, that is inserted into a socket of the top piece or platform, E, of the tripod by which the camera is supported. The shank D is provided with an annular groove, $d$, said groove being engaged by fulcrumed and spring-actuated jaws $D^2$, as shown clearly in Fig. 2. By compressing the outer ends of the jaws $D^2$ the inner ends spread apart, as shown in dotted lines in Fig. 2, so as to clear the shank D' and permit the removing of the camera from the tripod. For attaching the camera to the tripod the clamping-jaws $D^2$ are similarly pressed together and the shank D' inserted and then locked by said jaws, which engage the annular groove $d$, as shown in Figs. 2 and 3. By this means a very simple and quickly-operated locking attachment, by which the camera is secured to the tripod, is obtained.

The sleeve D serves to guide a longitudinal rod, F, which is capable of longitudinal adjustment by a groove, $f$, and spline $f'$ of the sleeve, but prevented thereby from turning axially. The front end of the camera is adjusted to any suitable angle of inclination required by an adjusting-screw, $g$, which turns by a grooved collar, $g'$, in a perforated keeper, $g^2$, of the bridge C, as shown in Fig. 3. The shank of the screw $g$ engages a swivel-nut, $g^3$, at the under side of the transverse supporting-plate B, said nut being pivoted to ears $g^4$ on the under side of the plate B, as shown in Fig. 4. By turning the screw $g$ in one or the other direction the front part of the camera can be adjusted to a forward or backward angle of inclination to the vertical plane. For the purpose of facilitating the adjustment of the rod F the same may be provided with a longitudinal rack, $h$, that is engaged by a pinion, $h'$, on a spindle, $h^2$, of the sleeve D, as shown in Fig. 6.

The rear end of the longitudinal rod F is provided with a socket-sleeve, F', having a vertical hole and a set-screw, $F^2$, at the rear end, said sleeve and set-screw serving for supporting a vertical rod, $F^3$, attached to the rear end of the camera. By adjusting the vertical rod $F^2$ higher or lower in the socket-sleeve F' the rear end of the camera is quickly adjusted higher or lower, as required, while the bellows-shaped body of the camera is extended to the required length by sliding the longitudinal rod backward or forward in the guide-sleeve D.

To decrease the weight of the camera the longitudinal rod can be made in the shape of a tube. All the parts, being of metal, can be made comparatively light and are not liable to swell or warp owing to the presence of moisture in the atmosphere, as when the parts are made of wood, so that they can be adjusted at any time without difficulty, and the camera being thus easily handled, considerably lighter, and more easily packed than with the wooden guide and supporting devices heretofore in use.

Having thus described my invention, I claim as new and desire to secure by Letters Patent—

1. The combination, with a camera, of a supporting-plate attached to the front part of the camera and provided with arc-shaped guide-ways, a transverse piece or bridge engaging said ways, and an adjusting screw swiveled in a keeper on said bridge and its shank engaging a swivel-nut on said supporting-plate for adjusting said supporting-plate on said bridge, substantially as set forth.

2. The combination, with the top piece or platform of a tripod, of the supporting-frame of a camera having a grooved shank, and spring-actuated jaws fulcrumed to the under side of said platform and adapted to engage the grooved shank of the supporting frame, substantially as set forth.

3. The combination of a camera having a supporting-frame and guide-sleeve at the front end, a longitudinal rod guided in said sleeve, a socket-sleeve and set screw at the rear end of the rod, and a vertical rod attached to the rear part of the camera and adjusted higher or lower in the socket-sleeve, substantially as set forth.

In testimony that I claim the foregoing as my invention I have signed my name in presence of two subscribing witnesses.

HANS P. PEDERSEN.

Witnesses:
 PAUL GOEPEL,
 CARL KARP.